United States Patent [19]
Lin

[11] Patent Number: 6,079,683
[45] Date of Patent: Jun. 27, 2000

[54] ANGLE ADJUSTABLE SUPPORT FOR A SUN-SHADE DEVICE

[76] Inventor: Yung-Ching Lin, No. 8, Lane 762, Chung-Shan N. Rd., Yung-Kang City, Tainan Hsien, Taiwan

[21] Appl. No.: 09/205,766

[22] Filed: Dec. 4, 1998

[51] Int. Cl.[7] .................................. E04G 3/00; B60J 1/20
[52] U.S. Cl. ............................... 248/292.12; 160/370.22; 296/97.7
[58] Field of Search ............................... 248/292.12, 469, 248/473, 474, 122.1, 397, 229.22, 229.24, 230.3, 230.5, 231.41, 231.61; 160/370.21, 370.22, DIG. 3; 403/97, 103, 345; 296/97.8, 97.7

[56] References Cited

U.S. PATENT DOCUMENTS

| | | | |
|---|---|---|---|
| 4,869,542 | 9/1989 | Lin | 296/97.8 |
| 5,036,898 | 8/1991 | Chen | 160/23.1 |
| 5,172,745 | 12/1992 | Wang | 160/370.2 |
| 5,301,915 | 4/1994 | Bahniuk et al. | 248/452 |
| 5,408,774 | 4/1995 | Grewe et al. | 40/606 |
| 5,495,884 | 3/1996 | Shikler | 160/120 |
| 5,562,144 | 10/1996 | Ming-shun | 160/370.22 |
| 5,638,884 | 6/1997 | Lin | 160/370.22 |
| 5,791,721 | 8/1998 | Lin | 296/97.8 |
| 5,901,937 | 5/1999 | Compeau et al. | 248/442.2 |

*Primary Examiner*—Anita M. King
*Attorney, Agent, or Firm*—Christensen O'Connor Johnson Kindness PLLC

[57] ABSTRACT

An angle adjustable support is to be used for supporting a sun-shade device, and includes a base with a pair of pivot lobes, a retaining member having a coupling portion adapted for coupling with the sun-shade device and a retaining projection which is pivoted on the pivot lobes, and an adjusting unit which includes a stationary clamping member disposed below the retaining projection and having a first retaining surface, a movable clamping member disposed below the retaining projecting and having a second retaining surface, and a regulating rod that extends threadedly through the movable clamping member and that is coupled rotatably to the stationary clamping member. The regulating rod is operable to move the movable clamping member from a locking position, in which the first and second retaining surfaces engage the peripheral surface of the retaining projection for cooperatively clamping and positioning the retaining projection between the clamping members, and an unlocking position, in which the second retaining surface is moved away from the first retaining surface to release the retaining projection from the clamping members and to permit pivoting of the retaining member for adjustment of the inclination of the sun-shade device.

4 Claims, 5 Drawing Sheets

ANGLE ADJUSTABLE SUPPORT FOR A SUN-SHADE DEVICE

BACKGROUND OF THE INVENTION

1. Field of the Invention

This invention relates to an angle adjustable support for supporting a sun-shade device, more particularly to an angle adjustable support that is easily operable to adjust the inclination of the sun-shade device.

2. Description of the Related Art

A sun-shade device is commonly installed in an automobile adjacent to a rear window for shading the interior of the automobile from sunlight. Since the inclinations of automobile rear windows vary in different types of automobiles, it is desirable that the inclination of a screen of the sun-shade device be adjustable so as to suit different types of automobiles. FIG. 1 illustrates a conventional angle adjustable support for supporting a sun-shade device. The angle adjustable support includes a base 11 having a pivot portion 112 and a pair of upwardly extending mounting projections 111, and a coupling plate 121 pivoted to the pivot portion 112. The coupling plate 121 is coupled to a sun-shade device 13, and is formed with a pair of downwardly extending regulating arms 122 that extend toward the mounting projections 111, respectively. Each of the regulating arms 122 is formed with an elongated slot 123. A screw fastener 151 extends through a respective one of the mounting projections 111 and through the elongated slot 123 formed in an adjacent one of the regulating arms 122 to engage the adjacent regulating arm 122 for positioning the sun-shade device 13 at a predetermined inclination. To adjust the inclination of a screen 14 of the sun-shade device 13, the screw fasteners 151 are released, and the regulating arms 122 are moved relative to the mounting projections 111 to move the coupling plate 121 and the sun-shade device 13 pivotally relative to the base 11. After the sun-shade device 13 has been adjusted to a desired inclination, the screw fasteners 151 are extended once again through the mounting projections 111 and the slots 123 in the regulating arms 122 to position the sun-shade device 3 at the adjusted inclination.

The above-described angle adjustable support achieves the purposes of supporting a sun-shade device 13 and of adjusting the inclination of the screen 14 of the sun-shade device 13. However, the adjustment operation is normally conducted with the use of a tool for loosening and tightening the screw fasteners 151. Moreover, by relying upon the engagement between the screw fasteners 151 and the elongated slots 123, the sun-shade device 13 cannot be positioned securely at a desired inclination. The conventional angle adjustable support is not satisfactory.

SUMMARY OF THE INVENTION

Therefore, the object of the present invention is to provide an angle adjustable support for supporting a sun-shade device which is convenient to operate in order to adjust the inclination of the sun-shade device.

Accordingly, the angle adjustable support of the present invention includes a base, a retaining member, and an adjusting unit. The base has a horizontal base plate and a parallel pair of pivot lobes projecting upwardly from the base plate. The retaining member has a coupling portion adapted for coupling with the sun-shade device, and a retaining projection projecting downwardly from the coupling portion. The retaining projection extends between the pivot lobes, and is mounted pivotally on the pivot lobes about a horizontal pivot axis perpendicular to the pivot lobes. The retaining projection has a peripheral surface. The adjusting unit includes a stationary clamping member, a movable clamping member and a regulating rod. The stationary clamping member is disposed on the base plate between the pivot lobes and below the retaining projection of the retaining member. The stationary clamping member has a first retaining surface. The movable clamping member is disposed on the base plate between the pivot lobes and below the retaining projection of the retaining member. The movable clamping member has a second retaining surface. The regulating rod extends threadedly through the movable clamping member, and is coupled rotatably to the stationary clamping member. The regulating rod is operable to move the movable clamping member from a locking position, in which the first and second retaining surfaces engage the peripheral surface of the retaining projection of the retaining member for cooperatively clamping and positioning the retaining projection between the stationary and movable clamping members, thereby positioning the sun-shade device at a desired inclination, and an unlocking position, in which the second retaining surface is moved away from the first retaining surface to release the retaining projection from the movable and stationary clamping members and to permit pivoting of the retaining member about the pivot axis for adjustment of the inclination of the sun-shade device.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
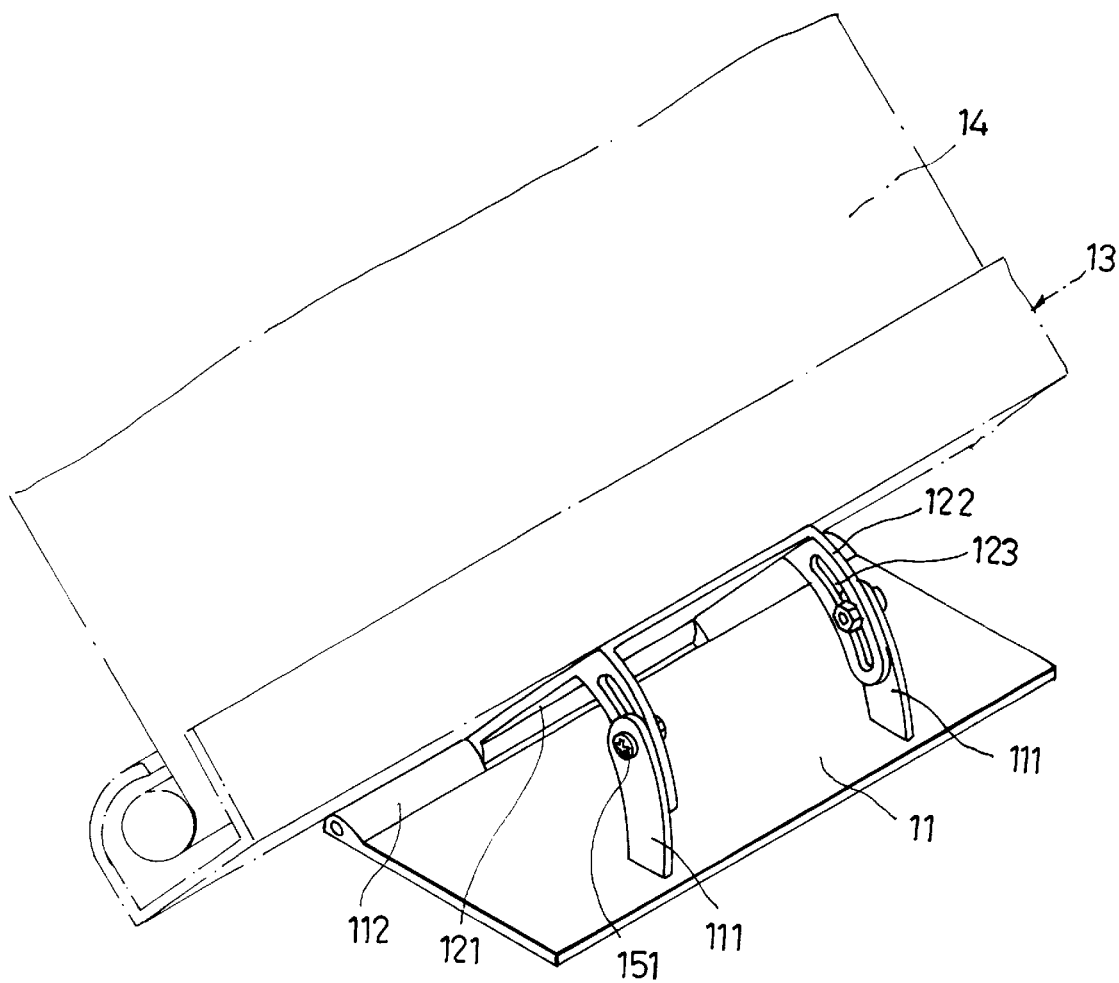
FIG. 1 is a perspective view of a conventional angle adjustable support for a sun-shade device.
Figure 2:
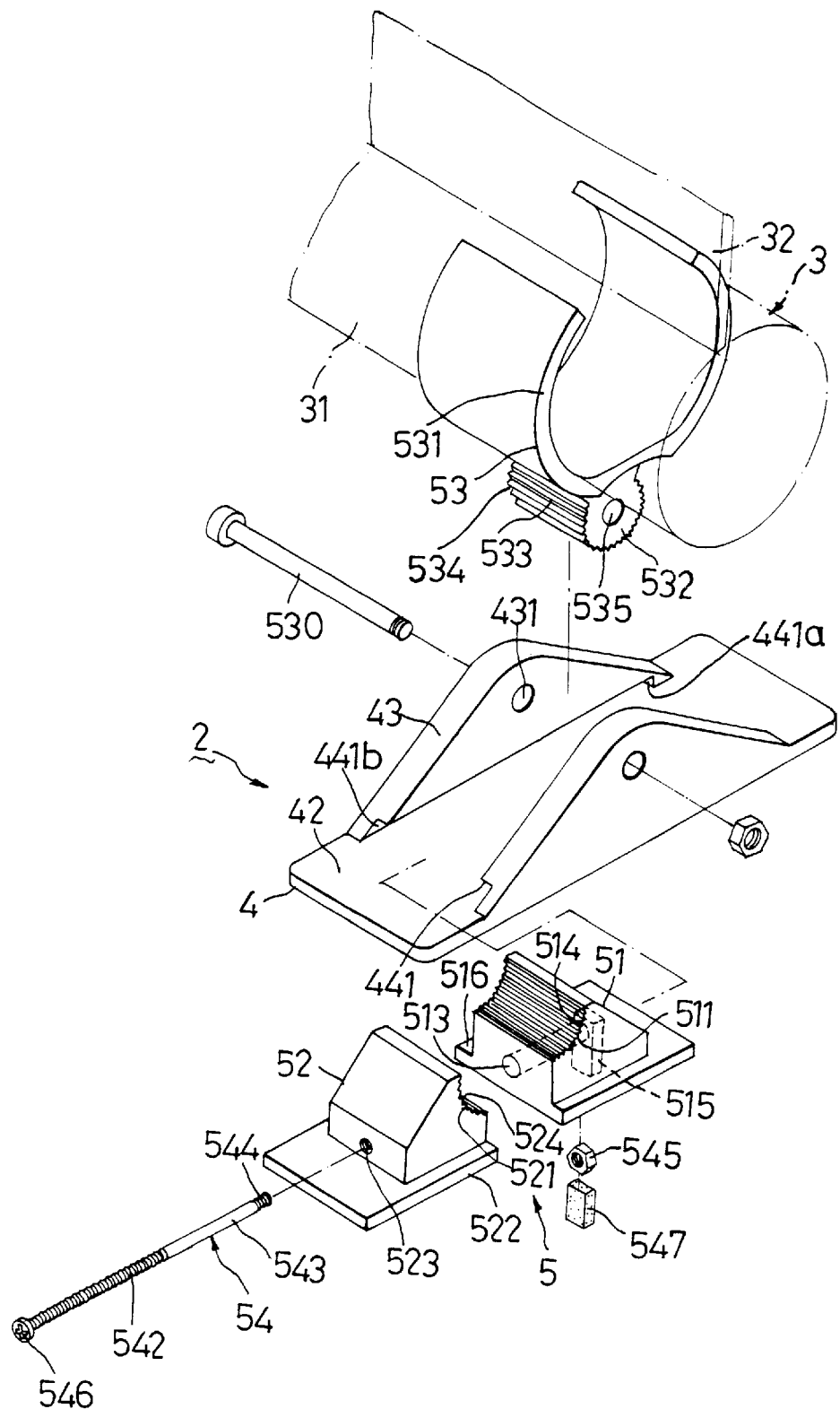
FIG. 2 is an exploded perspective view of a preferred embodiment of the angle adjustable support according to the present invention.
Figure 3:
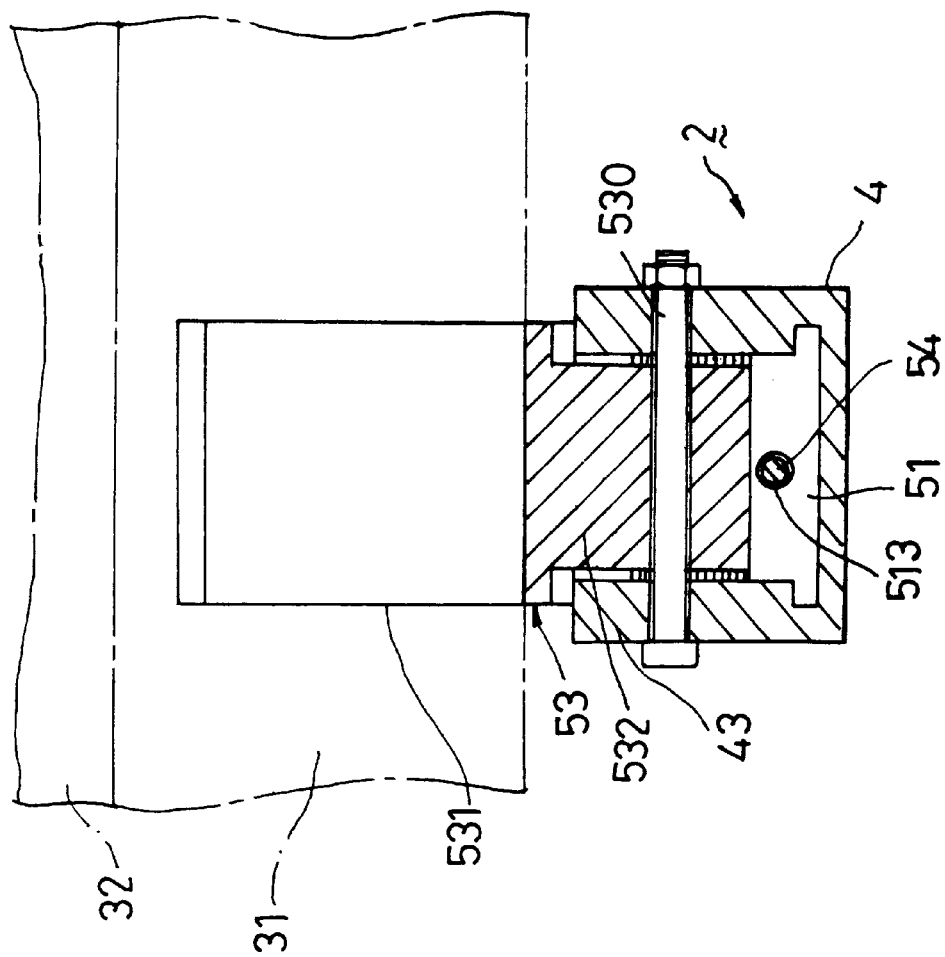
FIG. 3 is a cross-sectional view of the angle adjustable support of the preferred embodiment.

Referring to FIGS. 2 and 3, the preferred embodiment of the angle adjustable support 2 according to the present invention is to be used for supporting a sun-shade device 3 which includes an elongated housing 31 and a screen 32 mounted on the elongated housing 31. The angle adjustable support 2 is shown to include a base 4, a retaining member 53, and an adjusting unit 5.

The base 4 includes a rectangular base plate 42, and a parallel pair of triangular pivot lobes 43 projecting upwardly from the base plate 42. The pivot lobes 43 are formed with aligned pivot holes 431. Each of the pivot lobes 43 has an inner side facing the other one of the pivot lobes 43 and formed with an elongated slide groove 441 that has a closed end 441a and an open end 441b.

The retaining member 53 includes a C-shaped coupling portion 531 adapted for coupling with the elongated housing 31 of the sun-shade device 3, and a retaining projection 532 projecting downwardly from the coupling portion 531. The retaining projection 532 is formed with a mounting hole 535 that extends horizontally therethrough, and has a curved peripheral surface 533 formed with a plurality of engaging teeth 534. The retaining projection 532 is extended between the pivot lobes 43 and is pivoted on the pivot lobes 43 by means of a horizontal pivot shaft 530 that extends through the pivot holes 431 in the pivot lobes 43 and the mounting hole 535 in the retaining projection 532.

The adjusting unit 5 includes a stationary clamping member 51 and a movable clamping member 52 which are disposed on the base plate 42 between the pivot lobes 43 and below the retaining projection 532, and a regulating rod 54. The stationary clamping member 51 has a concave first retaining surface 511 that complements a segment of the peripheral surface 533 of the retaining projection 532 and that is formed with engaging teeth 514 thereon for meshing with the engaging teeth 534 on the peripheral surface 533 of the retaining projection 532. The stationary clamping member 51 further has a pair of wing portions 516 that extend into the slide grooves 441 in the pivot lobes 43 via the open ends 441b of the slide grooves 441 so as to be disposed adjacent to the closed ends 441a of the slide grooves 441. The stationary clamping member 51 is formed with an insert hole 513 that extends horizontally in a direction transverse to the pivot shaft 530, and has a bottom side formed with a mounting cavity 515 that extends to the insert hole 513. A nut 545 is placed in the insert hole 513 via the mounting cavity 515, and is rotatably retained in the insert hole 513. The insert hole 513 is blocked by a blocking member 547 after placing the nut 545 therein.

The movable clamping member 52 has a concave second retaining surface 521 that complements another segment of the peripheral surface 533 of the retaining projection 532 and that is formed with engaging teeth 524 thereon for meshing with the engaging teeth 534 on the peripheral surface 533 of the retaining projection 532. The movable clamping member 52 further has a pair of wing portions 522 that extend slidably into the slide grooves 441 in the pivot lobes 43 via the open ends 441b of the slide grooves 441. The movable clamping member 52 is formed with a threaded hole 523 aligned with the insert hole 513 in the stationary clamping member 51.

The regulating rod 54 has an operating head portion 546, a threaded section 542 adjacent to the head portion 546, a smooth section 543 adjacent to the threaded section 542, and a threaded distal end portion 544 adjacent to the smooth section 543. The regulating rod 54 extends into the threaded hole 523 and the insert hole 513 such that the threaded section 542 engages threadedly the threaded hole 523 and such that the threaded distal end portion 544 engages the nut 545 for coupling rotatably the regulating rod 54 to the stationary clamping member 51. The operating head portion 546 is disposed out of the threaded hole 523, and may be formed to have a wing shape so as to facilitate rotation of the regulating rod 54. Since the regulating rod 54 is rotatably retained by the stationary clamping member 51, axial rotation of the regulating rod 54 thus results in linear movement of the movable clamping member 52 toward and away from the stationary clamping member 51 between a locking position, in which the second retaining surface 521 is moved adjacent to the first retaining surface 511 and the first and second retaining surfaces 511, 521 engage the peripheral surface 533 of the retaining projection 532 for cooperatively clamping the retaining projection 532 between the stationary and movable clamping members 51, 52, thereby positioning the sun-shade device 3 as well as the screen 32 thereof at a desired inclination, and an unlocking position, in which the second retaining surface 521 is moved away from the first retaining surface 511 to release the retaining projection 532 from the stationary and movable clamping members 51, 52.

Figure 4:
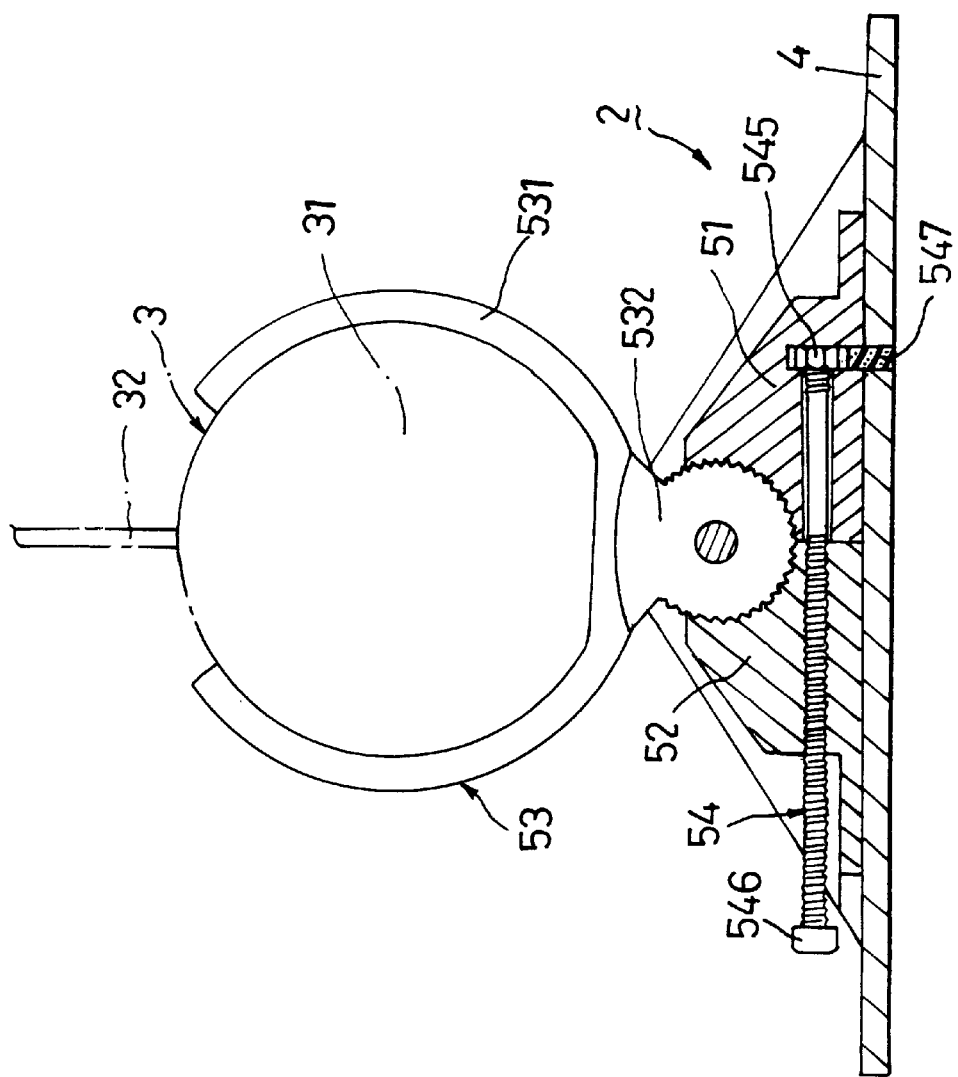
FIG. 4 is another cross-sectional view of the angle adjustable support of the preferred embodiment.

Referring to FIG. 4, to install the angle adjustable support 2 of the preferred embodiment onto the sun-shade device 3, the coupling portion 531 of the retaining member 53 is coupled to the elongated housing 31 of the sun-shade device 3, and the retaining projection 532 is clamped between the stationary and movable clamping members 51, 52.

Figure 5:
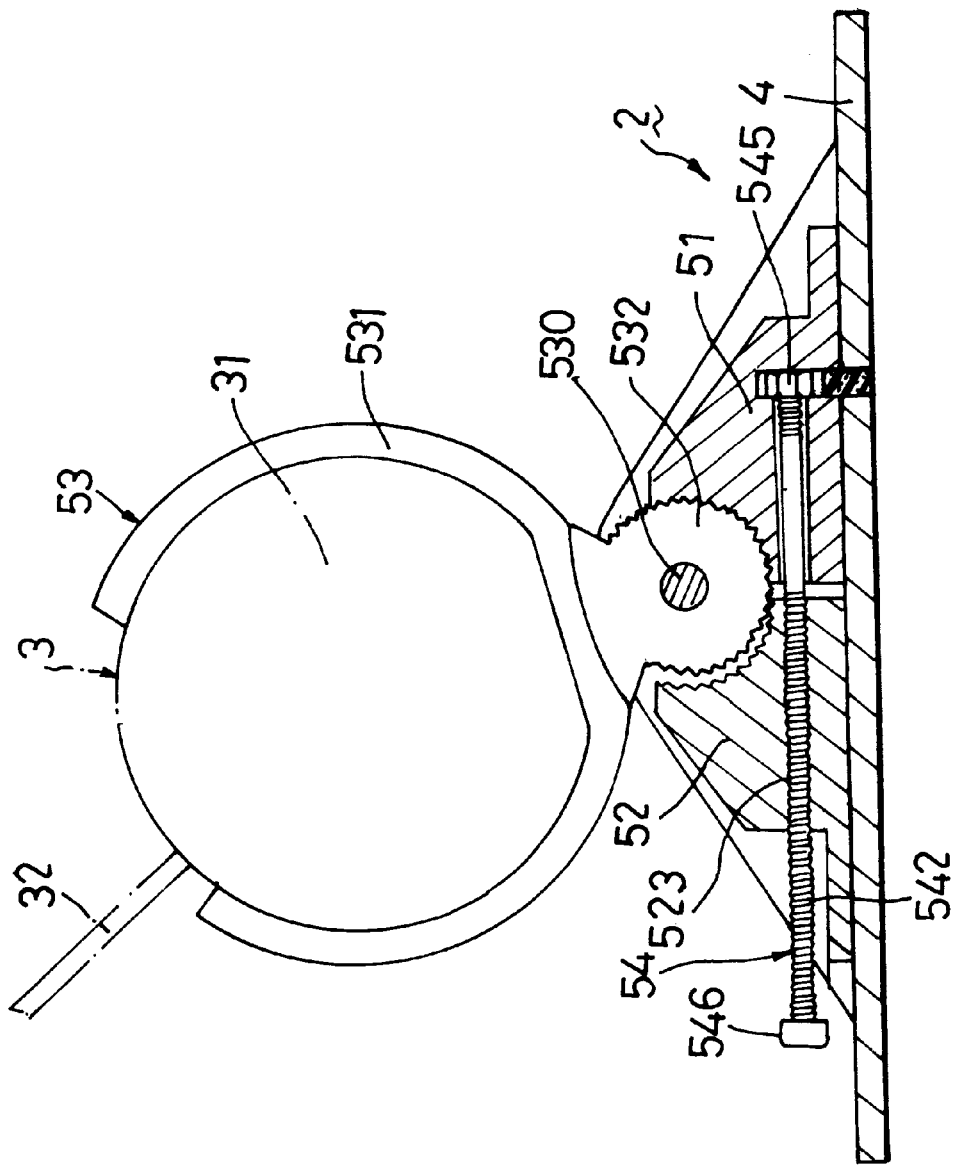
FIG. 5 is still another cross-sectional view of the angle adjustable support of the preferred embodiment, where an adjusting unit is operated to adjust the inclination of a sun-shade device.

Referring to FIG. 5, to adjust the inclination of the screen 32 of the sun-shade device 3, the regulating rod 54 is rotated axially in a certain direction to move the movable clamping member 52 away from the stationary clamping member 51, i.e. from the locking position to the unlocking position. At this time, since the retaining projection 532 is released from the stationary and movable clamping members 51, 52, the retaining projection 532 and the sun-shade device 3 can be moved together and pivotally about the pivot shaft 530 to adjust the inclination of the screen 32. After the screen 32 has been adjusted to a desired inclination, the regulating rod 54 is rotated axially in an opposite direction to move the movable clamping member 52 toward the stationary clamping member 51, i.e. from the unlocking position to the locking position, in order to clamp the retaining projection 532 between the clamping members 51, 52 and position the sun-shade device 3 at the adjusted inclination.

In the present invention, the coupling portion 531 has a generally C-shaped structure to conform with the shape of the elongated housing 31 of the sun-shade device 3. However, the shape of the coupling portion is not critical in the present invention as long as the coupling portion can be coupled to the sun-shade device to which the angle adjustable support is to be applied. During operation of the regulating rod 54, the wing portions 516 of the stationary clamping member 51 abut against end walls that define the closed ends 441a (see FIG. 2) of the slide grooves 441. Alternatively, the stationary clamping member 51 may be mounted fixedly on the base plate 42 of the base 4.

It has thus been shown that the inclination of the screen 32 of the sun-shade device 3 can be easily adjusted by operating the operating head portion 546 of the regulating rod 54. Moreover, in the illustrated embodiment, by virtue of the engagement between the engaging teeth 534, 514, 524 formed on the peripheral surface 533, and on the first and second retaining surfaces 511, 521, the sun-shade device 3 can be positioned securely at the desired inclination.

With this invention thus explained, it is apparent that numerous modifications and variations can be made without departing from the scope and spirit of this invention. It is therefore intended that this invention be limited only as indicated in the appended claims.

I claim:

1. An angle adjustable support for supporting a sun-shade device, said angle adjustable support comprising:

a base having a horizontal base plate and a parallel pair of pivot lobes projecting upwardly from the base plate;

a retaining member having a coupling portion adapted for coupling with the sun-shade device, and a retaining projection projecting downwardly from the coupling portion, said retaining projection extending between said pivot lobes and being mounted pivotally on said pivot lobes about a horizontal pivot axis perpendicular to said pivot lobes, said retaining projection having a peripheral surface; and an adjusting unit which includes:

a stationary clamping member disposed on said base plate between said pivot lobes and below said retaining projection, said stationary clamping member having a first retaining surface;

a movable clamping member disposed on said base plate between said pivot lobes and below said retaining projection, said movable clamping member having a second retaining surface; and a regulating rod extending threadedly through said movable clamping member and coupled rotatably to said stationary clamping member, said regulating rod being operable to move said movable clamping member from a locking position, in which said first and second retaining surfaces engage said peripheral surface of said retaining projection of said retaining member for cooperatively clamping and positioning said retaining projection between said stationary and movable clamping members, thereby positioning the sun-shade device at a desired inclination, and an unlocking position, in which said second retaining surface is moved away from said first retaining surface to release said retaining projection from said movable and stationary clamping members and to permit pivoting of said retaining member about said pivot axis for adjustment of the inclination of the sun-shade device.

2. The angle adjustable support as claimed in claim 1, wherein said peripheral surface of said retaining projection is curved and is formed with engaging teeth thereon, each of said first and second retaining surfaces being concave so as to complement said peripheral surface of said retaining projection and being formed with engaging teeth thereon for meshing with said engaging teeth of said retaining projection.

3. The angle adjustable support as claimed in claim 1, wherein said stationary clamping member is formed with an insert hole which permits extension of said regulating rod thereinto, said insert hole being provided with a nut which is rotatably retained in said insert hole for engaging said regulating rod.

4. The angle adjustable support as claimed in claim 1, wherein each of said pivot lobes has an inner side facing the other one of said pivot lobes and formed with a slide groove that extends in a horizontal direction transverse to said pivot axis, said movable clamping member being formed with an opposite pair of wing portions that extend slidably and respectively into said slide grooves.

\* \* \* \* \*